US012788177B2

(12) United States Patent
Panciera et al.

(10) Patent No.: US 12,788,177 B2
(45) Date of Patent: Nov. 10, 2026

(54) COFFEE MACHINE AND METHOD FOR DISPENSING A MILK EMULSION WITH SAID COFFEE MACHINE

(71) Applicant: DE' LONGHI APPLIANCES S.r.l., Treviso (IT)

(72) Inventors: Antonio Panciera, Treviso (IT); Simone Rosetta, Treviso (IT)

(73) Assignee: DE' LONGHI APPLIANCES S.r.l., Treviso (IT)

( * ) Notice: Subject to any disclaimer, the term of this patent is extended or adjusted under 35 U.S.C. 154(b) by 997 days.

(21) Appl. No.: 18/002,273

(22) PCT Filed: May 7, 2021

(86) PCT No.: PCT/EP2021/062133
§ 371 (c)(1),
(2) Date: Dec. 18, 2022

(87) PCT Pub. No.: WO2021/254689
PCT Pub. Date: Dec. 23, 2021

(65) Prior Publication Data
US 2023/0337852 A1 Oct. 26, 2023

(30) Foreign Application Priority Data
Jun. 19, 2020 (IT) ........................ 102020000014716

(51) Int. Cl.
*A47J 31/44* (2006.01)
*A47J 31/46* (2006.01)

(52) U.S. Cl.
CPC ....... *A47J 31/4485* (2013.01); *A47J 31/4403* (2013.01); *A47J 31/461* (2018.08)

(58) Field of Classification Search
CPC ... A47J 31/4485; A47J 31/461; A47J 31/4403
See application file for complete search history.

(56) References Cited

U.S. PATENT DOCUMENTS 7,644,652 B2 1/2010 Eimer et al.
2017/0303732 A1* 10/2017 Balkau ................ A47J 31/4485

FOREIGN PATENT DOCUMENTS

DE 102005004852 A1 8/2006
EP 0472272 A2 2/1992
(Continued)

OTHER PUBLICATIONS

International Search Report dated Jun. 8, 2021, from corresponding application No. PCT/EP2021/062133.

*Primary Examiner* — Elizabeth M Kerr
*Assistant Examiner* — Kuangyue Chen
(74) *Attorney, Agent, or Firm* — Troutman Pepper Locke LLP

(57) ABSTRACT

A coffee machine comprises a water tank, steam boiler, a water pump, an external coffee dispenser, an external steam dispenser with a steam flow opening, a milk container having an emulsifying device having a mixing chamber to mix milk/steam/air, a milk aspirating channel with an inlet into the mixing chamber, an air aspirating channel having a valve and an inlet into the mixing chamber, the mixing chamber having a connection with the external steam dispenser and an outlet of the milk emulsion aligned to the steam dispensing opening and connected to an external dispenser of the milk emulsion. The outlet opening is larger than the steam dispensing opening. The milk aspirating channel has a passage area sufficiently large to provide milk aspiration by Venturi effect to the dispensing of a milk emulsion, at a temperature no more than 25° C. higher than the temperature of the milk in the milk container.

4 Claims, 6 Drawing Sheets

(56) References Cited

FOREIGN PATENT DOCUMENTS

| | | | | | |
|---|---|---|---|---|---|
| EP | 1639925 | A2 | | 3/2006 | |
| EP | 2337481 | B1 | | 6/2011 | |
| EP | 2878241 | A1 | | 6/2015 | |
| EP | 3162257 | A1 | | 5/2017 | |
| EP | 3162357 | A1 | * | 5/2017 | ............. A61K 38/31 |

* cited by examiner

COFFEE MACHINE AND METHOD FOR DISPENSING A MILK EMULSION WITH SAID COFFEE MACHINE

CROSS REFERENCE TO RELATED APPLICATIONS

The present application is a U.S. National Phase application under 35 U.S.C. § 371 of International Patent Application No.: PCT/EP2021/062133 filed May 7, 2021, which claims priority of Italian Patent Application No. 102020000014716 filed Jun. 19, 2020. The entire contents of which are hereby incorporated by reference.

FIELD OF THE INVENTION

The present invention refers to a coffee machine and to a method for dispensing a milk emulsion with said coffee machine.

BACKGROUND

Coffee machines are widely available commercially today comprising a milk container having a Venturi-effect milk-emulsifying device.

These coffee machines are designed to obtain an emulsion of hot milk in a cup.

In practice the steam produced by a boiler of the coffee machine is fed into a mixing chamber provided in the emulsifying device where the Venturi effect creates a vacuum that draws milk from a suitable container of the milk and air from the external atmospheric environment.

Typically, the temperature of the milk emulsion is significantly greater than the environmental temperature of 25° C. and this is due to the fact that the steam required to trigger the Venturi effect has the further effect of heating the milk.

In fact, typically, a milk emulsion can be produced at a final temperature in the cup comprised between 50° C. and 75° C.

It has been ascertained that the temperature of a foodstuff affects the perception of the taste that occurs in the taste buds of the tongue and is completed with the aroma perceived by the receptors of the nasal mucous.

In fact, in the mouth, the temperature of the food or of the beverage modifies the microscopic channels of the taste buds and the sending of the signal to the brain through the taste nerves.

Below 15° C., the taste buds are almost paralysed, whereas at 37° C. the sensitivity of the taste buds increases over 100 times and for this reason the sweet taste of an ice cream is perceived only when it melts in the mouth.

On the other hand, hot food emits vapours that reach the nasal mucous and contribute about 80% to the perception of taste, but if the temperature exceeds 35° C., the perception of taste decreases, because the sensation of burning hides the tasting nuances.

SUMMARY

The technical task addressed by the present invention is thus to make a coffee machine adapted to heighten the perception of the taste of the dispensed milk emulsion.

Within the context of this technical task, an aim of the invention is to make a coffee machine that is suitable for dispensing a milk emulsion at low temperature. Another aim of the invention is to make a coffee machine having a milk-emulsifying device that is easy to clean.

A further aim of the invention is to make a coffee machine having a kit of interchangeable milk emulsifying devices for producing milk emulsion at low temperature and at high temperature.

The technical task, and these and other aims according to the present invention are achieved by making a coffee machine comprising a water tank, a boiler for the production of steam, a water supply pump for supplying water to the boiler for generation of steam, an external coffee dispenser, an external steam dispenser having a dispensing opening for dispensing a steam flow, a milk container having an emulsifying device for emulsifying the milk by Venturi effect generated by the steam flow, said emulsifying device having a mixing chamber for mixing milk/steam/air, a milk aspirating channel by Venturi effect having an inlet opening into the mixing chamber, an air aspirating channel by Venturi effect having valve means and an inlet opening into the mixing chamber, said mixing chamber having a sealed removable connection opening with the external steam dispenser and an outlet opening of the milk emulsion aligned to the steam dispensing opening and connected to an external dispenser of the milk emulsion, wherein the outlet opening of the milk emulsion is larger than the steam dispensing opening for the activation of the Venturi effect, characterised in that said minimal passage area of said milk aspirating channel has a diameter not less than 5 mm, the dispensing opening area of the external steam dispenser has a diameter comprised between 0.5 mm and 2 mm, the outlet opening area has a diameter comprised between 2 mm and 5 mm, an air inlet opening in the air aspirating channel adjustable by said valve means has, in a maximum opening configuration, a diameter comprised between 0.3 mm and 2 mm, and said external steam dispenser is configured to dispense a steam flow comprised between 0.8 g/s and 1.2 g/s at a steam temperature comprised between 110° C. and 130° C. and at a steam pressure comprised between 0.5 and 2 atm.

The present invention also discloses a dispensing method for dispensing a milk emulsion into a cup with a coffee machine comprising a water tank, a boiler for the production of steam, a water supply pump for supplying water to the boiler for generation of steam, an external coffee dispenser, an external steam dispenser having a dispensing opening for dispensing a steam flow, a milk container having an emulsifying device for emulsifying the milk by Venturi effect generated by the steam flow, said emulsifying device having a mixing chamber for mixing milk/steam/air, a milk aspirating channel by Venturi effect having an inlet opening into the mixing chamber, an air aspirating channel by Venturi effect having valve means and an inlet opening into the mixing chamber, said mixing chamber having a sealed removable connection opening with the external steam dispenser and an outlet opening of the milk emulsion aligned to the steam dispensing opening and connected to an external dispenser of the milk emulsion, wherein the outlet opening of the milk emulsion is larger than the steam dispensing opening for the activation of the Venturi effect, characterised in dispensing a flow of milk emulsion having a value comprised between 10 g/s and 15 g/s at a temperature no more than 25° C. higher than the temperature of the milk present in the milk container by means of a reduced thermal energy contribution of the steam used to milk aspiration corresponding to a weight of condensed steam in the milk emulsion between 2% and 8% greater than the weight of the milk aspirated from the milk container.

In one embodiment of the invention a flow of milk emulsion is dispensed having a value comprised between 10 g/s and 15 g/s at a temperature no more than 20° C. higher than the temperature of the milk present in the milk container.

In one embodiment of the invention said container is filled with milk having a temperature comprised between 3° C. and 7° C.

In one embodiment of the invention, said milk container has thermal insulation.

In one embodiment of the invention, said milk aspirating channel is interchangeable with a milk aspirating channel having a smaller minimal passage area.

In one embodiment of the invention, said valve means are interchangeable with valve means that provides an adjustable inlet opening for the entry of air into the air aspirating channel, having in a maximum opening configuration a smaller area. In one embodiment of the invention, the coffee machine has a cup resting surface, the external coffee dispenser is configured and arranged for direct dispensing into a cup positioned on the cup resting surface, and the external milk emulsion dispenser is configured and arranged for direct dispensing into said cup.

BRIEF DESCRIPTION OF THE DRAWINGS

Further features and advantages of the invention will become more apparent from the description of a preferred, but not exclusive, embodiment of the coffee machine according to the invention, which is illustrated by way of approximate and non-limiting example in the attached drawings, of which.

DETAILED DESCRIPTION

Figure 1:
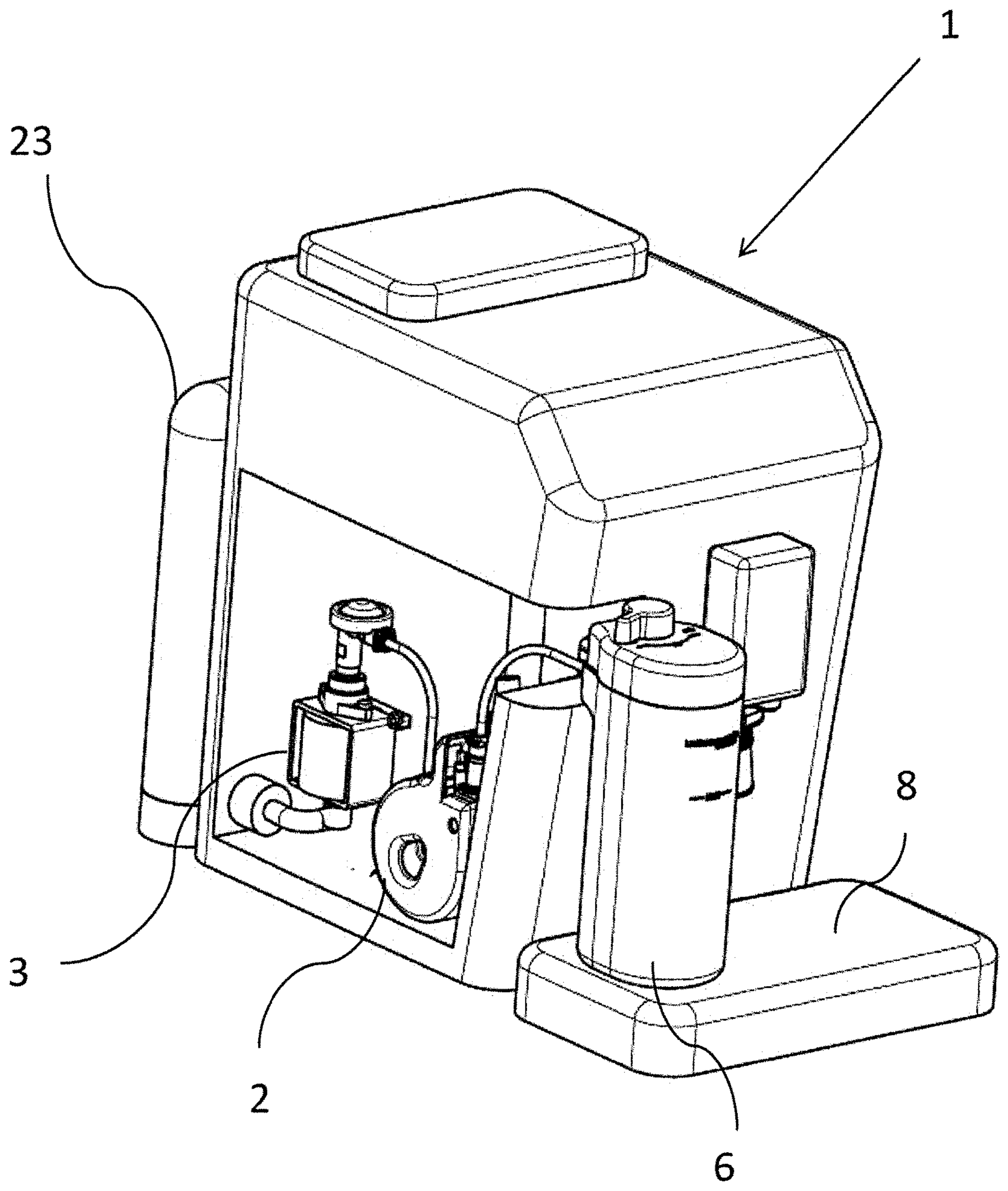
FIG. 1 shows the coffee machine with the emulsifying device connected.
Figure 2:
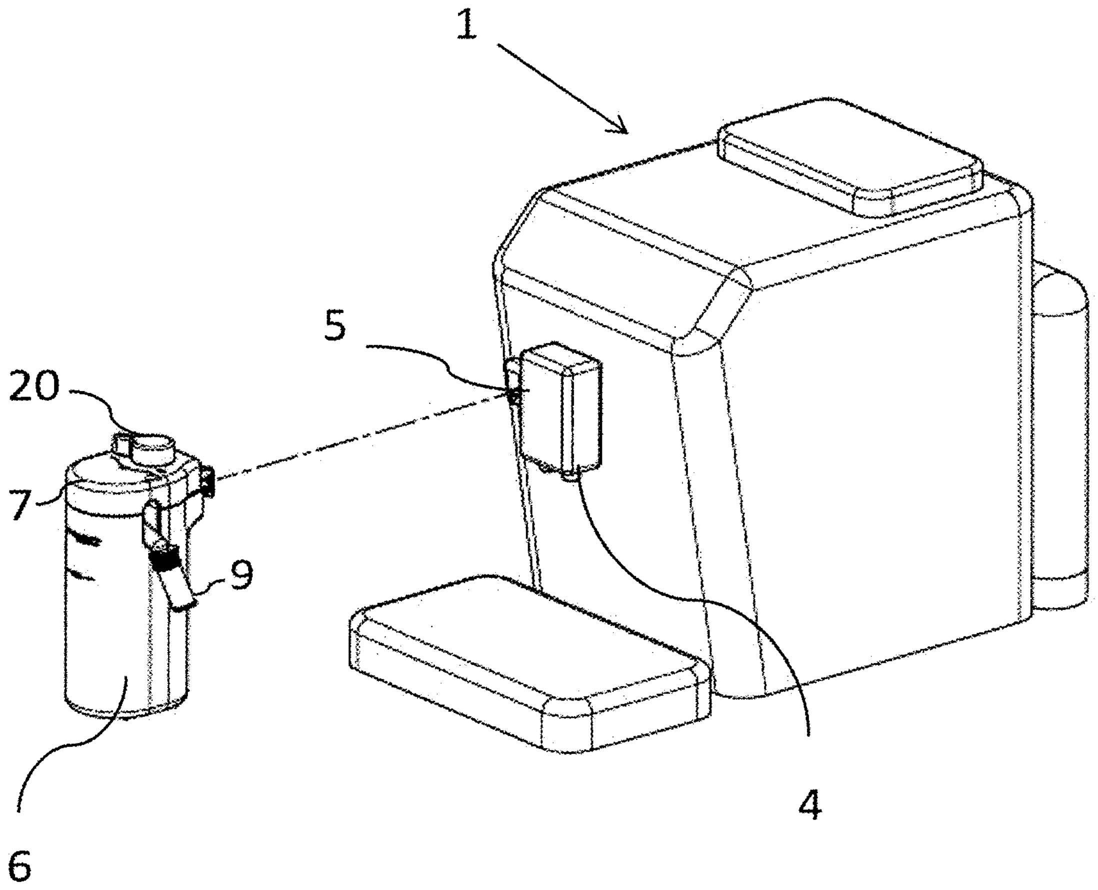
FIG. 2 shows the coffee machine with the emulsifying device disconnected.

With reference to the figures cited, a coffee machine is shown and indicated in its entirety by reference number 1.

The coffee machine 1 comprises a water tank 23, boiler 2 for the production of steam, a water supply pump 3 for supplying water to the boiler 2 for generation of steam, an external coffee dispenser 4, an external steam dispenser 5, and a milk container 6 having an emulsifying device 7 for emulsifying the milk by Venturi effect.

The external steam dispenser 5 is configured to dispense a steam flow comprised between 0.8 g/s and 1.2 g/s at a temperature comprised between 110° C. and 130° C. and at a pressure comprised between 0.5 atm and 2 atm.

Preferably, the coffee machine 1 is configured to dispense the milk emulsion directly into the cup and for this purpose features a cup resting surface 8 on which also the milk container 6 rests.

In particular, the external coffee dispenser 4 is configured and arranged for direct dispensing into a cup below positioned on the cup resting surface 8, and the emulsifying device 7 has an external dispenser 9 of the milk emulsion which is also configured and arranged for direct dispensing into the cup.

The emulsifying device 7 has a mixing chamber 10 for mixing milk/steam/air, a milk aspirating channel 12 for aspirating the withdrawn milk by Venturi effect from the milk container 6 and having an inlet opening 11 into the mixing chamber 10, an air aspirating channel 14 by Venturi effect having valve means 15 and an inlet opening 13 into the mixing chamber 10, a sealed removable connection opening 16 with the external steam dispenser 5, and an outlet opening 17 of the milk emulsion aligned to the steam dispensing opening 19 and connected to the external dispenser 9 of the milk emulsion.

The emulsifying device 7 is integrated into an extractable cover 18 of the milk container 6, but in one version it can be integrated directly into the milk container 6.

The outlet opening 17 is positioned on the extension of the axis L of the external steam dispenser 5 whilst the milk inlet opening 11 and the air inlet opening 13 are arranged radially and on the side opposite the extension of the axis L of the external steam dispenser 5.

The milk aspirating channel 12 can consist at least partially of a structurally independent tubular piece stiffly connected to the body of the mixing chamber 10 and extending as far as the bottom of the milk container 6.

The external dispenser 9 of the milk emulsion can consist at least partially of a structurally independent tubular piece connected rotatably to the body of the mixing chamber 10 between a rest position and a dispensing position.

The valve means 15 can comprise a shutter and a knob 20 for driving thereof adapted to close or open in an adjustable manner the air aspirating channel 14.

The shutter in the case under examination consists of a hollow stem 30 that extends coaxially and solidly constrained to the knob 20.

The hollow stem 20 is in turn housed coaxially in the air aspirating channel 14 and engages peripherally with a tilted internal perimeter rib 31 of the air aspirating channel 14.

The tilted rib 31 can be formed on a removable portion of the air aspirating channel 14.

The hollow stem 20 is provided with an air inlet opening 22 in the air aspirating channel 14.

The air inlet opening 22 in the air aspirating channel 14 is configured as a slit that extends in the axial direction of the hollow stem 20.

The atmospheric air enters the cavity of the stem 20 through the slit and the cavity of the stem 20 communicates directly with the inlet opening 13 for the entry of the air into the mixing chamber 10.

The rotation of the knob 20 on its axis varies the intersection position of the slit with the tilted rib 31 and then varies the section of the slit that is used for the entry of air into the aspirating channel 14.

The section of the slit used for the entry of the air into the air aspirating channel 14 is in fact the section comprised between the apex of the slit and the point where the slit intersects the rib 31.

The air aspirating channel 14 is closed when the tilted rib 31 is positioned at an upper apex of the slit.

Starting from this position, as the knob 20 is rotated, a progressively increasing section of the slit opens and then an inlet area for the entry of the air into the air aspirating channel 14 grows progressively up to a maximum value.

Downstream of the slit, the air passage area along the air aspirating channel is the same as or greater than the aforesaid maximum value.

It is clear that the amount of the increase of the inlet area for the entry of the air into the air aspirating channel 14 is correlated with the width of the slit, the wider the slit, the greater the inlet area for the entry of the air into the air aspirating channel 14 and the maximum value thereof.

The milk aspirating channel 12 has a minimal passage area sufficiently large as to ensure the dispensing of a milk emulsion having a weight of between 2% and 8%, still better between 3% and 6% greater than the weight of the milk aspirated from the milk container 6, the additional weight of the milk emulsion compared to the aspirated milk being that of the condensed steam included into the milk emulsion.

In particular, the milk aspirating channel 12 has a minimal passage area sufficiently large as to ensure the dispensing of a flow of milk emulsion having a value comprised between 10 g/s and 15 g/s.

The milk inlet opening 11 is circular and has a diameter not less that 5 mm, preferably comprised between 5 mm and 10 mm.

The milk aspirating channel 12 has a minimum inner cross section that is not less than the inlet opening of the milk 11.

The dispensing opening 21 of the external steam dispenser 5 is circular and has a diameter comprised between 0.5 mm and 2 mm, preferably between 0.5 mm and 1 mm, and is lower than the outlet opening 17.

The air aspirating opening is circular and has a diameter comprised between 0.2 mm and 1 mm.

The valve means 15, as said, adjusts the air passage area along the air aspirating channel 14.

The inlet opening 22 of the air in the air aspirating channel 14, in a maximum opening configuration, has an equivalent diameter comprised between 0.3 mm and 2 mm.

Equivalent diameter means the diameter of a circular area of the same size as the area of the inlet opening 22 for entry of the air into the air aspirating channel 14.

The outlet opening 17 is circular and has a diameter comprised between 2 mm and 5 mm, preferably between 2 mm and 2.5 mm.

The emulsifying device 7 by Venturi effect can thus have great milk aspiration efficiency with an aspirated milk flow of not less than 10 g/s.

With the milk aspirating channel 12 that is thus dimensioned, a milk emulsion is obtained at a temperature that is not higher than 25° C. when the temperature of the milk present in the milk container 6 is comprised between 3° C. and 7° C. In order to maintain the temperature at a value that is significantly below ambient temperature, the milk container 6 can have thermal insulation.

The milk emulsifying device can have interchangeable parts for dispensing a hotter milk emulsion.

In particular, the air adjusting valve means and preferably also the milk aspirating channel can be interchangeable.

Figure 3:
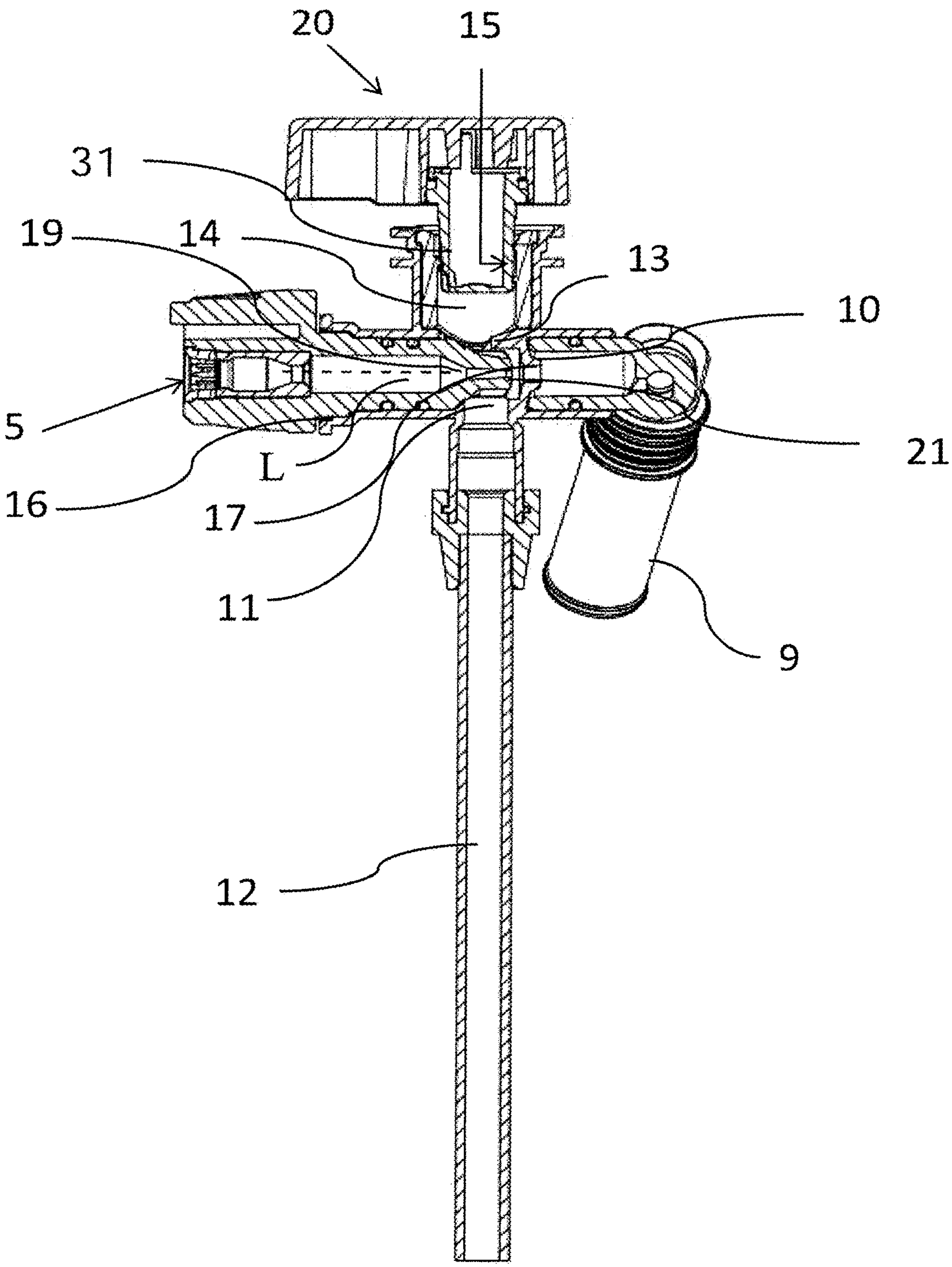
FIG. 3 shows a vertical section of the mixing chamber of the emulsifying device for producing the cold emulsion of milk.
Figure 4:
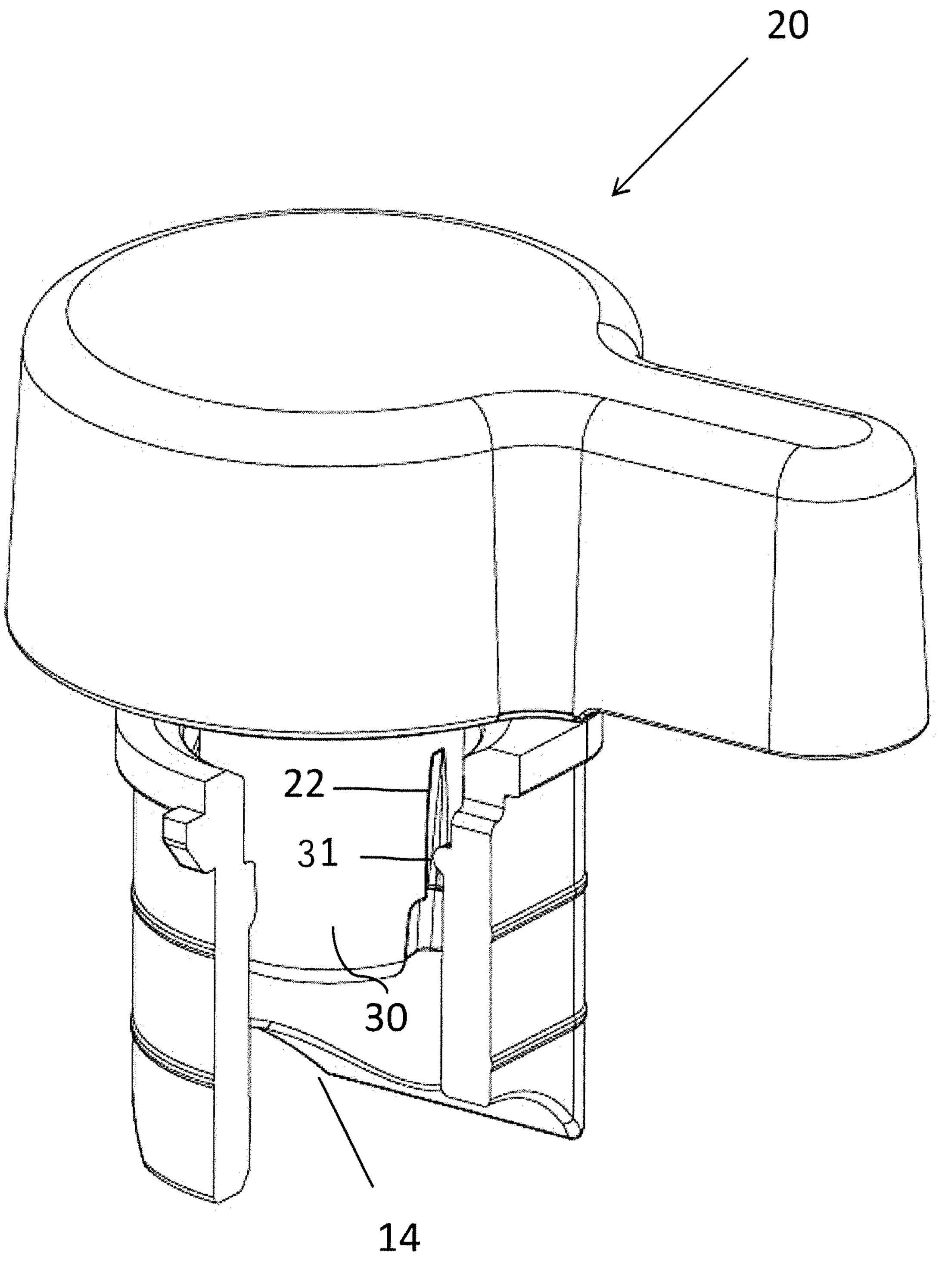
FIG. 4 shows the knob with the valve means for producing the cold emulsion of milk.
Figure 5:
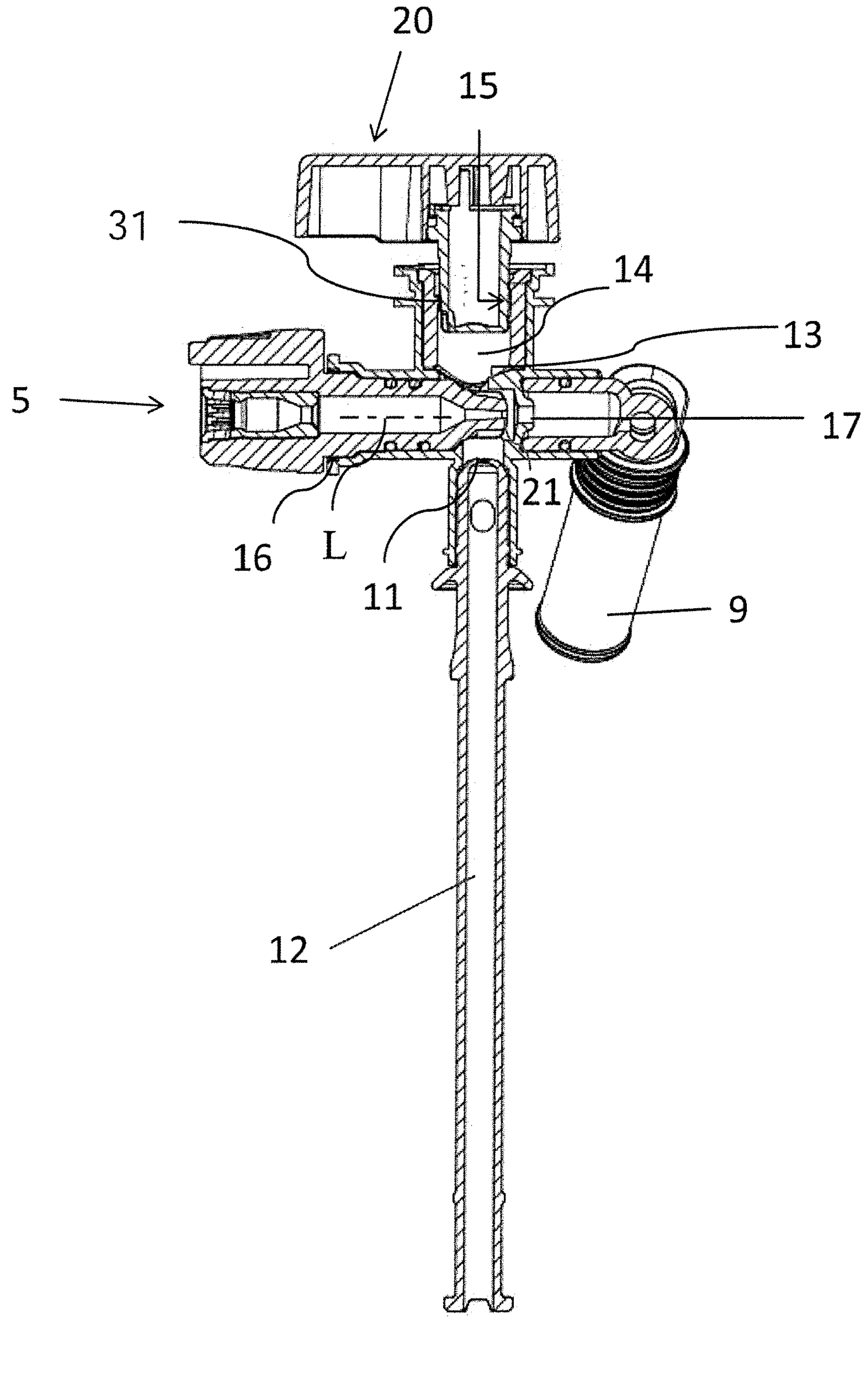
FIG. 5 shows a vertical section of the mixing chamber of the emulsifying device for producing the hot emulsion of milk.
Figure 6:
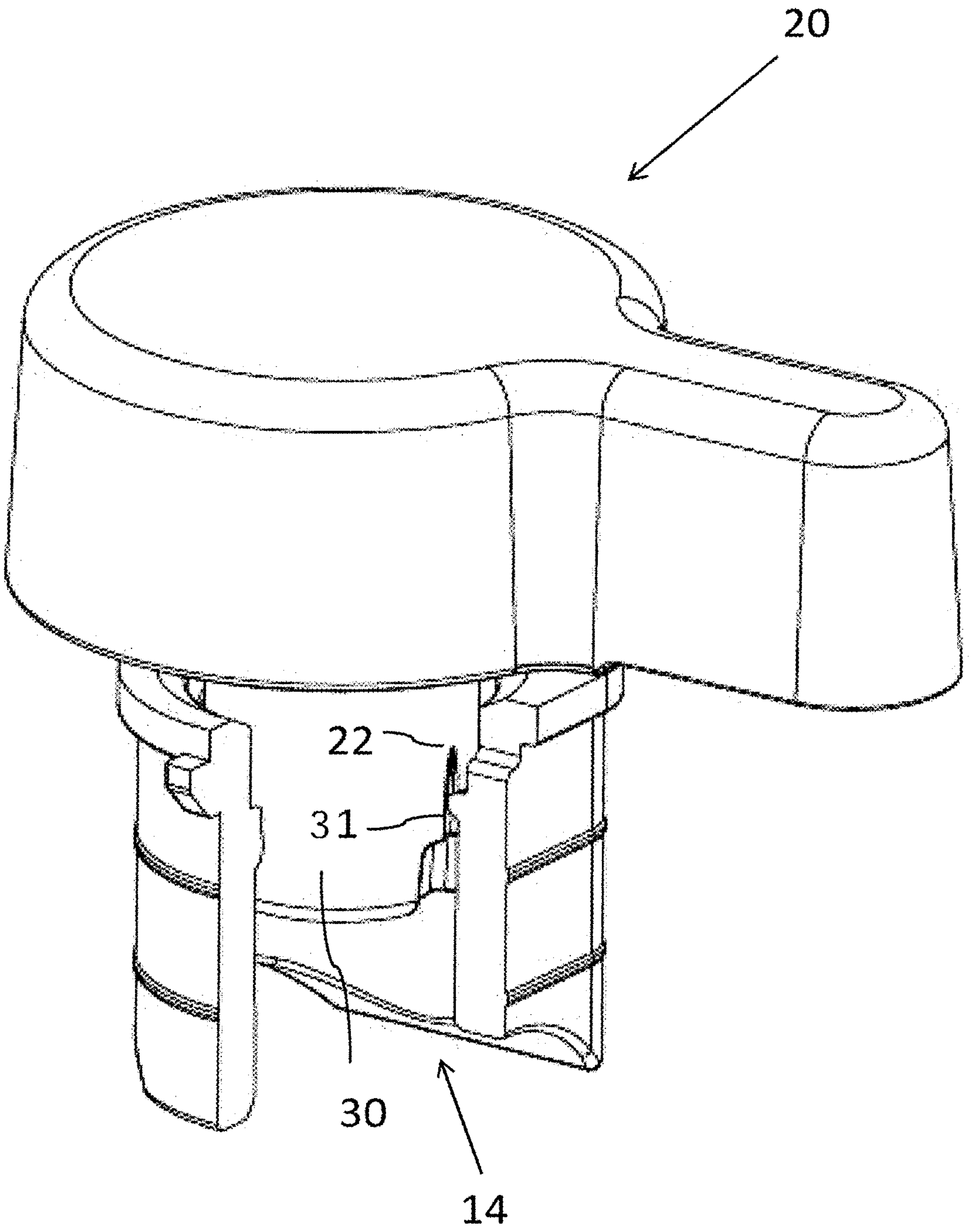
FIG. 6 shows the knob with the valve means for producing the hot emulsion of milk.

The comparison between the air adjusting valve means and the milk aspirating channel illustrated in FIGS. 3 and 4 with the means illustrated in FIGS. 5 and 6 clarifies better, also visually, the difference.

In fact, for producing a hotter milk emulsion, the milk aspirating channel illustrated in FIGS. 5 and 6 is used, that, having a lower minimal passage area, for example at the end of the interchangeable part, lowers the efficiency of milk aspiration by Venturi effect.

Further, again for producing a hotter milk emulsion, valve means illustrated in FIGS. 5 and 5 can be used that provides a smaller maximum passage area of the inlet opening 22 for entry of the air into the air aspirating channel 14 because the slit has a reduced width.

With these replacements, a milk emulsion can be produced at a final temperature in the cup comprised between 50° C. and 75° C.

The method for dispensing the milk emulsion increases the efficiency of milk aspiration by Venturi effect by increasing, with respect to a traditional emulsifying device that produces a hotter milk emulsion, the minimal passage area of the milk aspirating channel up to a value corresponding to dispensing a milk emulsion having a weight of between 2% and 8% greater than the weight of the milk aspirated from the container, and a flow of milk emulsion having a value comprised between 10 g/s and 15 g/s.

Compared to prior art emulsifying devices by Venturi effect for aspirating milk and air in the mixing chamber, the minimal passage area of the milk aspirating channel is now increased up to a value corresponding to the dispensing of a milk emulsion at a temperature that is not higher than 25° C. when the temperature of the milk present in the milk container is comprised between 3° C. and 7° C. and the steam dispensed by the external steam dispenser 5 has a temperature comprised between 110° C. and 130° C. and a pressure comprised between 0.5 atm and 2 atm. The coffee machine as conceived herein is susceptible to many modifications and variations, all falling within the scope of the inventive concept; further, all the details are replaceable by technically equivalent elements.

For example, the various openings disclosed above, also those that are disclosed for example as having a circular shape, can have a non-circular shape and in this case diameter is to be intended to be the equivalent diameter, i.e. the diameter of a circle that has substantially the same non-circular opening area.

Further, the scope of the claims is intended to cover milk emulsions of animal or vegetable origin (for example cow's milk, soya milk, oat milk, rice milk, goat's milk, buffalo milk, sheep milk etc.)

In practice, the materials used, as well as the dimensions, can be any according to the needs and the state of the art.

The invention claimed is:

1. A dispensing method for dispensing a milk emulsion into a cup with a coffee machine, the coffee machine comprising a water tank, a boiler configured to produce steam, a water supply pump configured to supply water from the water tank to the boiler, an external coffee dispenser, an external steam dispenser having a steam dispensing opening configured to dispense a steam flow from the boiler, a milk container comprising an emulsifying device configured to emulsify milk held therein by Venturi effect generated by the steam flow, said emulsifying device comprising a mixing chamber, a milk aspirating channel having an inlet opening into the mixing chamber, an air aspirating channel having an inlet opening into the mixing chamber, said mixing chamber comprising a sealed removable connection opening with the external steam dispenser and an outlet opening of the milk emulsion aligned to the steam dispensing opening and connected to an external dispenser of the milk emulsion, wherein the outlet opening of the milk emulsion is larger than the steam dispensing opening for the activation of the Venturi effect, the method comprising the step of:

dispensing a flow of the milk emulsion having a value comprised between 10 g/s and 15 g/s at a temperature no more than 25° C. higher than a temperature of the milk present in the milk container by a reduced thermal energy contribution of the steam flow used to aspirate the milk from the milk container corresponding to a weight of condensed steam in the milk emulsion between 2% and 8% greater than the weight of the milk aspirated from the milk container.

2. The dispensing method for dispensing the milk emulsion according to claim 1, wherein dispensing the flow of milk emulsion having a value comprised between 10 g/s and 15 g/s at a temperature no more than 20° C. higher than the temperature of the milk present in the milk container.

3. The dispensing method for dispensing the milk emulsion according to claim 1, further comprising the step of filling said milk container with milk the having a temperature comprised between 3° C. and 7° C.

4. A dispensing method for dispensing a milk emulsion into a cup associated with a coffee machine comprising at least a milk container having an emulsifying device for emulsifying milk within the milk container by Venturi effect generated by a steam flow, the method comprising the step of:

dispensing a flow of the milk emulsion having a value comprised between 10 g/s and 15 g/s at a temperature no more than 25° C. higher than a temperature of the milk present in the milk container by a reduced thermal energy contribution of the steam flow used to aspirate the milk from the milk container corresponding to a weight of condensed steam in the milk emulsion between 2% and 8% greater than the weight of the milk aspirated from the milk container.

* * * * *